United States Patent
Dietrich

(10) Patent No.: US 6,497,042 B1
(45) Date of Patent: Dec. 24, 2002

(54) METHOD OF MAKING A TENSIONED SPOKED BICYCLE WHEEL

(76) Inventor: Rolf Dietrich, 4631 Shadowood, Toledo, OH (US) 43614

( * ) Notice: Subject to any disclaimer, the term of this patent is extended or adjusted under 35 U.S.C. 154(b) by 0 days.

(21) Appl. No.: 09/744,848

(22) PCT Filed: Jul. 29, 1999

(86) PCT No.: PCT/US99/17175

§ 371 (c)(1),
(2), (4) Date: Jan. 29, 2001

(87) PCT Pub. No.: WO00/06319

PCT Pub. Date: Feb. 10, 2000

Related U.S. Application Data

(60) Provisional application No. 60/094,512, filed on Jul. 29, 1998.

(51) Int. Cl.[7] .............................................. B21D 53/26
(52) U.S. Cl. ............... 29/894.333; 301/58; 301/95.104; 301/104
(58) Field of Search ....................... 29/894.33, 894.333; 301/58, 104, 95; 157/1.5, 1.55

(56) References Cited

U.S. PATENT DOCUMENTS

| | | | | |
|---|---|---|---|---|
| 546,320 A | * | 9/1895 | Goodrich | 301/58 |
| 1,423,373 A | * | 7/1922 | Wagenhorst | 301/58 |

FOREIGN PATENT DOCUMENTS

| | | | | |
|---|---|---|---|---|
| FR | 2378642 | * | 9/1978 | 301/58 |

* cited by examiner

Primary Examiner—P. W. Echols
(74) Attorney, Agent, or Firm—David C. Purdue; John C. Purdue

(57) ABSTRACT

A method for building a bicycle wheel and the wheel. Inserting a threaded end (106) of a spoke (100) through a hole (126) in the rim (102), through a spacer (118), and engaging the threaded end (106) with an internally threaded connector (104). The rim (102) and the connector (104) cooperate to maintain the axis of the threaded end (106) of each spoke (100) in a given spoke hole (126) so that it is skewed relative to the axis of a first portion of each spoke (100) extending from the hub to the rim (102). While the connector (104) is turned to tension the spoke (100), the spoke (100) permanently bends at a point (128) remote from the spoke's thread end (106).

8 Claims, 7 Drawing Sheets

US 6,497,042 B1

METHOD OF MAKING A TENSIONED SPOKED BICYCLE WHEEL

This application claims the benefit of provisional application No. 60/094,512 filed Jul. 29, 1998.

BACKGROUND OF THE INVENTION

1. Field of the Invention

The present invention relates generally to bicycle type wheels and especially to such wheels including tensioned spokes connecting a rim to a hub. More specifically, the invention relates to front and rear, radially and tangentially laced, tensioned spoke wheels comprising a hub, a rim and a plurality of spokes connecting the rim to the hub, and a mechanism for attaching the spokes at the rim to reduce spoke stresses and breakage.

2. Description of the Prior Art

Spoked wheels, especially for bicycles, are laced generally in one of two spoking patterns. Radially spoked wheels, with spokes extending generally radially outwardly from hub flanges, are used as front wheels for bicycles. Tangentially spoked wheels, with spokes extending tangentially or nearly so, relative to the hub flanges, are used as rear bicycle wheels. In both cases, the longitudinal axis of a spoke deviates from a radial orientation relative to the intersection of the center plane of the wheel and the rotational axis of the wheel. This is illustrated in FIGS. 5 and 6, which are based upon FIGS. 2 and 1, respectively, of U.S. Pat. No. 4,583,787 ("Michelotti"), the disclosure of which is incorporated herein by reference.

FIG. 5 illustrates what we will call the centering angle of a spoke, in the context of a rim 10 which has a radius R. In the drawing, the radius R coincides with the center plane of a wheel including the rim 10, the center plane being perpendicular to the axis of rotation of the wheel and intersecting the center line of the rim. The longitudinal axis, designated SA, of a spoke (not shown) attached to a left hub flange (not shown) deviates from the rim radius R by an angle designated CA for centering angle. In the drawing, the spoke axis SA intersects the rim radius R outside of the rim 10. Because of this deviation, a spoke connected to the rim 10 and a left hub flange (not shown) exerts a lateral force which is balanced, more or less, depending on the spoking pattern, by an opposite lateral force exerted by a spoke (not shown) connected to the rim 10 and a right hub flange (not shown). These lateral forces keep the rim centered in the wheel center plane and provide essential lateral stability to radially spoked wheels and to tangentially spoked wheels. Thus, the name centering angle.

FIG. 6 illustrates what we will call the torsional angle of a spoke, in the context of a rim 12 which has a radius R. In the drawing, the radius R coincides with the center plane of a wheel including the rim 12, the center plane being perpendicular to the axis of rotation of the wheel and intersecting the center line of the rim 12. The longitudinal axis, designated SA, of a spoke 14 attached to a right or left hub flange (not shown) deviates from the rim radius R by an angle designated CA for torsional angle. Because of this deviation, which is found in tangentially spoked wheels, primarily used as rear driving wheels, the spoke is operable to transmit a pulling or torsional force from a rotating hub to the rim 12, tending to cause the rim to rotate. Thus, the name torsional angle. Generally speaking, there is no torsional angle in wheels which are radially spoked.

If it were not for the torsional and centering angles of spokes, securing them to a rim would be a fairly simple matter. It is, however, a complicated matter to secure spokes to a rim. This is further complicated because the centering angle and the torsional angle are not constant in bicycle wheels on a moving bicycle. The weight of a rider, forces associated with turning, forces associated with braking and forces associated with acceleration, among other things, can and do cause small but not insignificant changes in these angles and these changes occur very rapidly during cycling. These angle changes cause stresses in spokes, particularly where they are fastened to the rim, typically by internally threaded nipples. Various attempts to deal with these stresses are discussed below.

The Michelotti patent discloses a bush which is received in a spoke bore in a rim. The bush is configured with two cylindrical co-axial bodies for receiving the conical head and the cylindrical section of an internally threaded nipple which receives the threaded end of a spoke. The bush is further configured to minimize deviation between the common axes of the cylindrical bodies and the longitudinal axis of the spoke. Apart from difficulties associated with properly orienting the bushes to achieve the desired result, this approach does not begin to account for dynamic changes in the centering angle and the torsional angle.

Another prior art method is illustrated in FIG. 2 which shows a rim 20, in cross-section and a spoke 22 connected to the rim 20. The rim 20 has a rounded spoke bed indicated at 24 which is raised, as indicated at 26, adjacent to sidewalls 28 of the rim 20, and lower in the middle, as indicated at 30. A spoke bore, indicated at 32, has an axis which is oriented, so far as possible, to coincide with the longitudinal axis of the spoke 22, taking into account the centering angle as well as the torsional angle, if any, of the spoke 22. A nipple 34 is internally threaded and is attached to a threaded end 36 of the spoke 22. Portions of the bottom end 38 of the nipple 34 engage the rounded rim floor 24 while other portions of the bottom 38 of the nipple 34 do not engage the rim floor 24. This condition is exacerbated under dynamic conditions when the centering angle and the torsional angle are changing. The resulting stresses tend to concentrate in the unthreaded portion of the spoke 22, immediately adjacent to the threaded portion 36.

Referring now to FIGS. 3 and 4, an extended nipple 40, similar to the nipple shown in the Michelotti patent with a head 6, has a head 42 which is seated on a substantially flat rim floor 44 of a rim 45. As can be seen in FIG. 4, however, only a small portion of the underside 46 of the head 42 of the nipple 40 seats against the rim floor when it engages a spoke 47 extending through the rim 45. In this arrangement, the spoke hole, indicated at 48, is inclined so that its axis coincides generally with the longitudinal axis of the spoke, taking into account the centering angle and, if necessary, the torsional angle. The nipple 40 has a slot, indicated at 49 in FIG. 4, which is engageable by a screwdriver or the like to properly tension the spoke 47.

SUMMARY OF THE INVENTION

The present invention is based upon the discovery of an improved method for attaching a threaded end of a spoke to a rim and a wheel made in accordance with the method. According to the method, a rim, preferably one having a substantially flat rim floor, is provided with spoke bores that are oriented so that the axis of the bore coincides or is substantially parallel to a radius of the wheel. The threaded end of the spoke is inserted through the spoke bore, a cylindrical spacer element is positioned around the spoke end and an internally threaded nipple is attached to the threaded portion of the spoke end. According to the method, the spacer height is controlled, relative to the stiffness of the spoke, so that, when the spoke is tightened, the threaded portion and an unthreaded portion adjacent thereto coincide with or are substantially parallel to a radius of the wheel and so that a bend is formed in the spoke, as it is tightened to accommodate centering angle and, if necessary, the torsional angle. The bend is formed in the spoke at a point which is remote from the transition between the threaded portion of the spoke and the adjacent, unthreaded spoke portion. Preferably, the bend is formed at or near a point on the spoke, adjacent to point where the spoke exits the underside of the rim. This arrangement moves stresses of the type described above, away from the transition between the threaded portion of the spoke and the unthreaded portion of the spoke, while providing for a firm, stable support between the underside of the nipple and the spoke floor with good distribution of tensile stresses on the rim floor.

Accordingly, it is an object of the present invention to provide a method for connecting a spoke to a rim which will reduce stresses found in prior art wheels adjacent to the intersection of the threaded end portion of the spoke and the adjacent, unthreaded portion of the spoke.

It is a further object of the invention to provide a method for securing a spoke to a rim with a nipple so that the underside of the spoke is firmly supported relative to the rim floor.

It is a further object of this invention to provide a wheel which resists failure due to bending of the spoke adjacent to the intersection between the threaded end portion of the spoke and the adjacent unthreaded portion.

It is yet another object of the invention to provide a wheel in which an end portion of the spoke is oriented so that its longitudinal axis coincides with or is substantially parallel to a radius of the wheel and there is a bend in a portion of the spoke at a point which is remote from the intersection between the threaded portion of the spoke and the adjacent unthreaded portion.

It is a primary object of this invention to provide an improved spoked wheel.

These and other objects and advantages of the present invention will no doubt become apparent to those skilled in the art after having read this detailed description of the invention including the following description of the preferred embodiment which is illustrated by the various figures of the drawing.

DETAILED DESCRIPTION OF THE PREFERRED EMBODIMENTS

Figure 1:
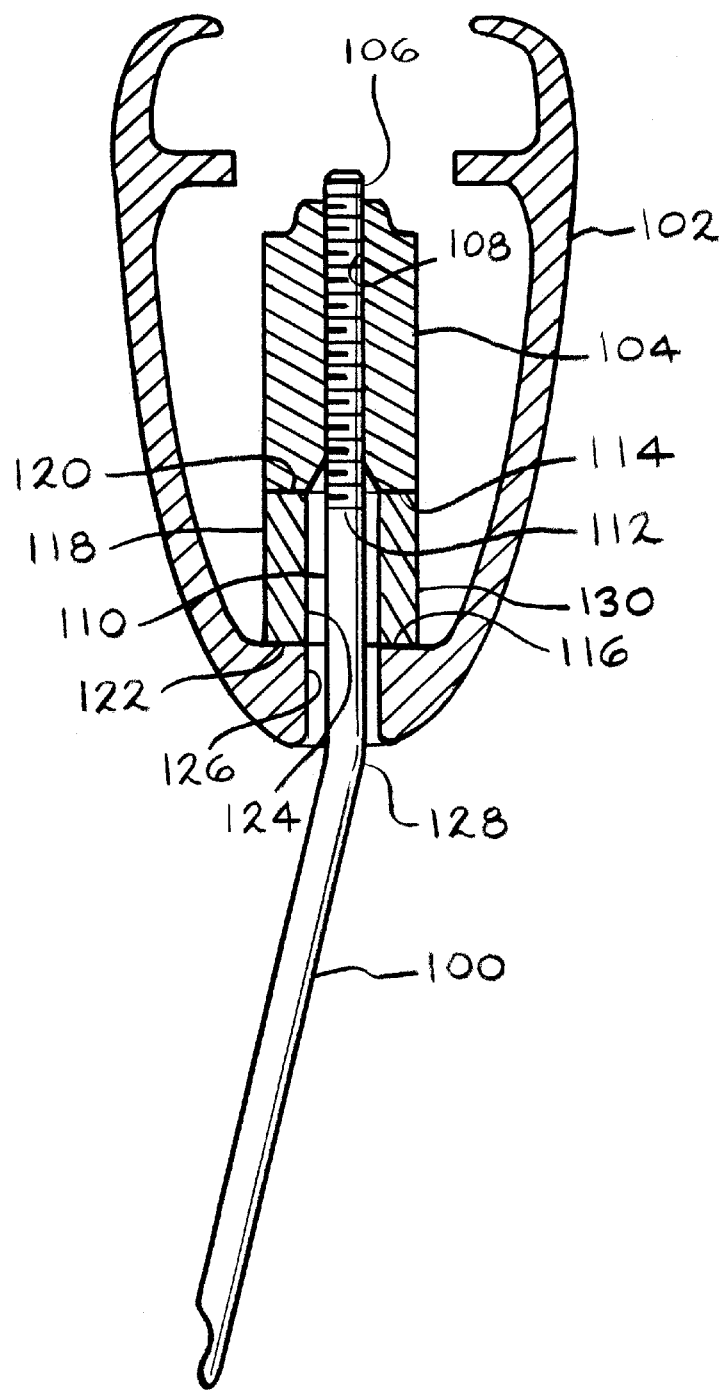
FIG. 1 is a view, partially in cross-section, of a portion of a rim section including a spoke and rim connection according to the present invention.
Figure 2:
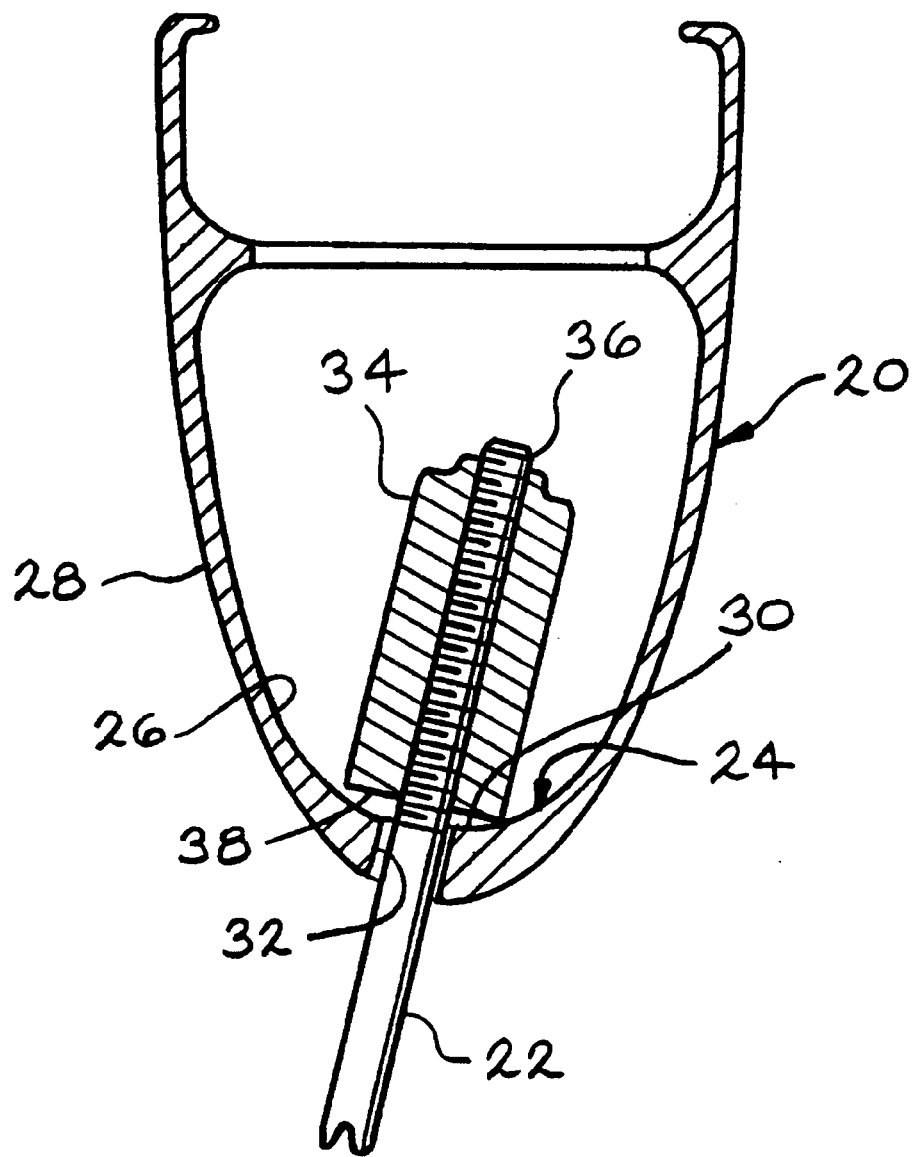
FIG. 2 is a view, partially in cross-section, of a rim section showing a prior art spoke and rim connection.
Figure 3:
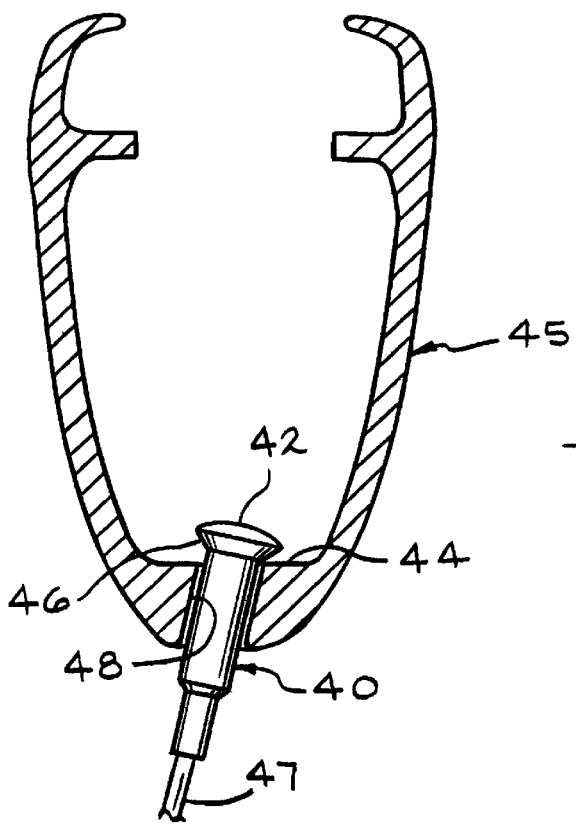
FIG. 3 is a cross-sectional view of a rim section showing a prior art spoke and rim connection.
Figure 4:
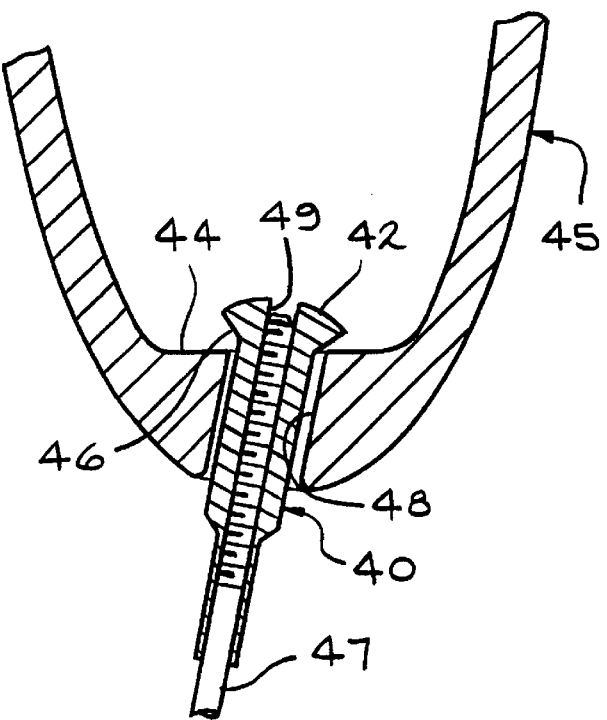
FIG. 4 is a cross-sectional view of a rim section showing a prior art spoke and rim connection.
Figure 5:
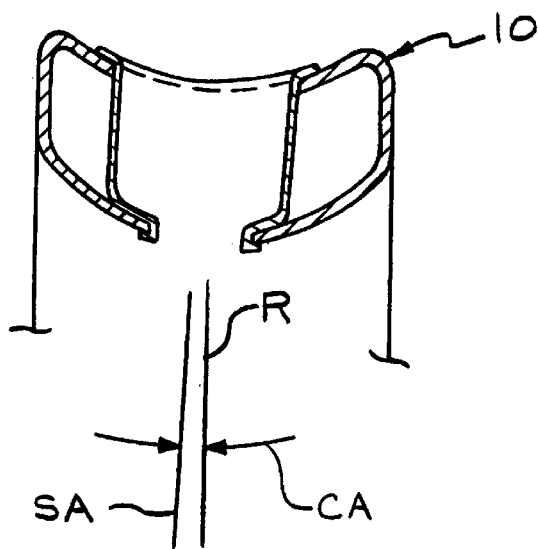
FIG. 5 is a modified version of FIG. 2 of the Michelotti patent, illustrating the centering angle of a spoke.
Figure 6:
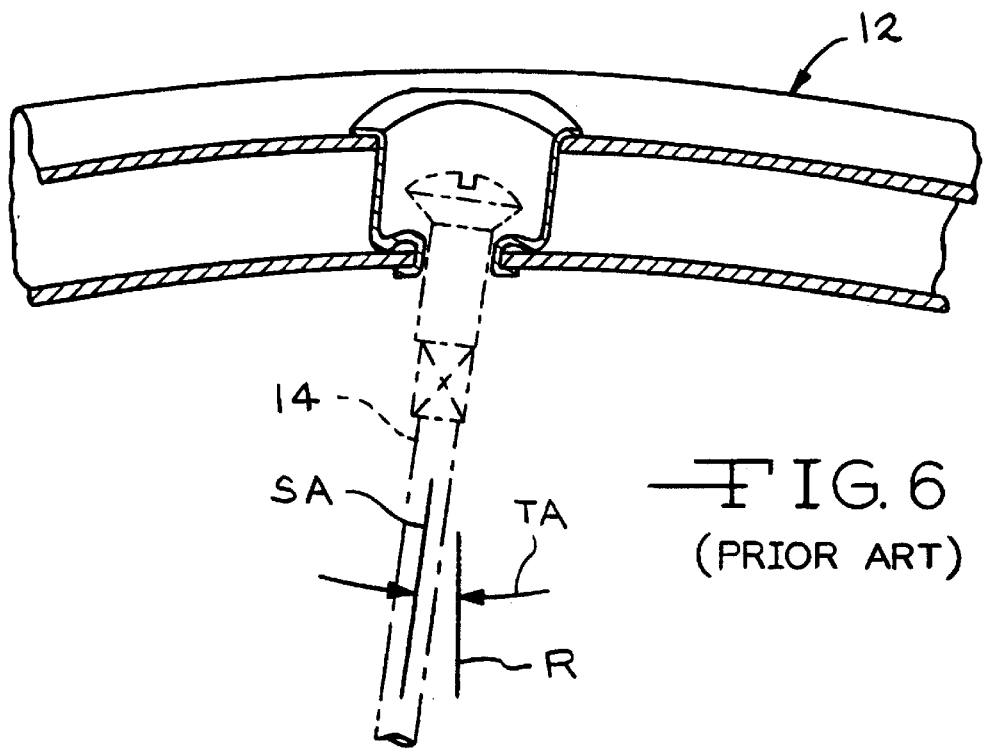
FIG. 6 is a modified version of FIG. 1 of the Michelotti patent, illustrating the torsional angle of a spoke.

Referring to FIG. 1, a spoke 100 is shown connected to a rim 102 by a nipple 104. An end portion 106 of the spoke 100 is threaded and is received in an internally threaded bore, indicated at 108, in the nipple 104. The outer surface of the nipple may have four or six sides or flats (not shown) engageable by a wrench, although other torque transmitting configurations may certainly be employed. Preferably, there is a locking feature incorporated in the bore 108 of the nipple 104 which serves to lock the nipple 104 to the spoke 100 so that the nipple will not turn relative to the spoke. This feature in the art is known generally as a locking nut.

Adjacent to the threaded portion 106 of the spoke 100, there is an unthreaded portion 110 of the spoke 100. The intersection between the threaded portion 106 and the unthreaded portion 110 is indicated by the reference numeral 112. Generally, wheels are designed so that the intersection 112 is adjacent to an underside 114 of the nipple 104 when the spoke is at final tension.

The rim has a substantially flat rim floor, indicated at 116 although it will certainly be appreciated that the floor bed is actually a surface of revolution. However, because radius of the rim floor is relatively large, especially compared to the size of the nipple, the rim floor 116 may be considered substantially flat for present purposes.

Between the underside 114 of the nipple 104 and the rim floor 116, there is a spacer element 118. It is basically a right cylinder with a flat end 120 which abuts the underside 114 of the nipple and a flat end 122 which abuts the rim floor 116. The abutment occurs when the spoke 100 is tightened, along with other spokes in the wheel, to produce a finished wheel. These tensions may be quite high, as in the case of a low spoke count wheel having, for example, 16 or so spokes. The spacer 118 has an internal bore, indicated at 124, which has an axis which is perpendicular to the surfaces 120 and 122. The bore 124 is slightly larger in diameter than the unthreaded portion 110 of the spoke 100, so that the spoke is easily received in the bore 124. Generally speaking, the diameter of the bore 124 should be about one tenth of an inch larger than the diameter of the spoke portion received therein.

The unthreaded portion 110 of the spoke 100 extends through the spacer 118 and through a spoke bore, indicated at 126, through the rim. When the spoke 100 is tightened, as by turning the nipple 104, the threaded portion 106 and the adjacent unthreaded portion 110 of the spoke 100, remain substantially straight down to a bend 128 in the spoke, which occurs in the spoke at or near the point where the spoke 100 exits the underside of the rim 102. The outer portion of the spoke, above the bend 128, remains substantially straight and coincides with or is substantially parallel to a radius of the rim 102. The inner portion of the spoke 100, below the bend 128, has a longitudinal axis which coincides with the centering angle and, if necessary, the torsional angle of the wheel, as measured from the bend 128. The height of the spacer 118 is a few millimeters and various heights will work in the method of this invention. The height must be such that, when the spoke is tightened, it will bend at a point coinciding with or adjacent to the bend 128, remote from the intersection 112 of the threaded portion 106 and the unthreaded portion 112. Excellent results have been achieved with two spacers having a combined height of 5 millimeters. The spacer height might have to be lower or higher, depending upon the stiffness of the spoke. It will be appreciated that a two piece or multiple piece spacer could be substituted for the single spacer 118, provided that the pieces have an appropriate combined height. Essentially, the spacer 118 has an upper surface 120 and lower surface 122 which are parallel to each other and a spoke bore 124 having a longitudinal axis which is substantially perpendicular to the surfaces 120 and 122. The spacer 118 is illustrated as having an outer surface 130 which is substantially cylindrical although it may have other configurations and still perform in accordance with the present invention.

It will be appreciated that, when the spoke 100 is attached to the rim 102 in accordance with the method of the present invention, the spoke 100 is forced to bend, as it is tightened at about the point where it exits the spoke bore 126 in the rim. Because the longitudinal axes of the nipple 104, the spacer 118 and the spoke bore 126 coincide with or are substantially parallel to a radius of the wheel, and the upper and lower surfaces 120 and 122 of the spacer are perpendicular to the axes, the lower surface 122 seats squarely on the rim floor 116, providing excellent distribution of the tensile forces to the rim floor 116, all around the spoke bore 126. The spoke bend 128 accommodates the centering angle and, if necessary, the torsional angle, minimizes stresses in the region of the intersection 112 between the threaded portion of the spoke 106 and the unthreaded portion of the spoke 110, and dissipates the stresses caused by dynamic changes in the centering and torsional angles.

Figure 7:
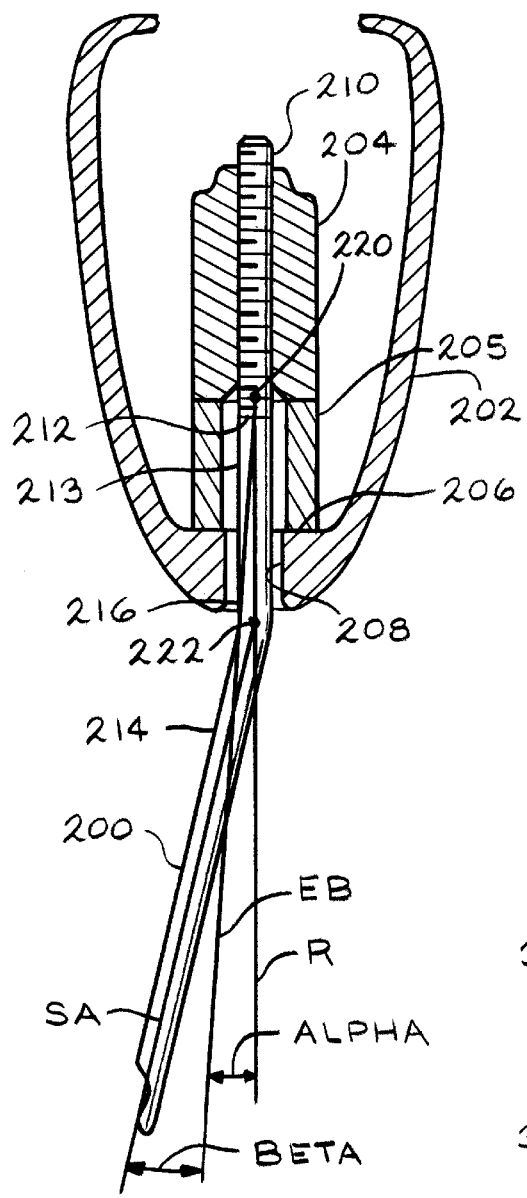
FIG. 7 is a view, partially in cross-section, of a portion of a rim section illustrating further details of a spoke and rim connection according to the present invention.

Referring now to FIG. 7, there is illustrated a spoke and rim connection, according to the present invention, for front and rear wheels. A spoke 200 is attached to a carbon fiber rim 202 by a connector comprising an internally threaded nipple 204 and a spacer 205. It will be appreciated that the connector could be a unitary element rather than two elements as shown in FIG. 7. The rim 202 has a spoke bed 206 and a spoke bore indicated at 208 extending through the rim. A threaded portion 210 of the spoke 200 is received in the nipple 204 and the threaded portion 210 of the spoke 200 terminates, within the rim 202, at a point designated 212 and an unthreaded portion 213 extends down to and through the spoke bore 208 and towards a hub flange (not shown) of a hub. A first portion 214 of the spoke 200 extends from a hub (not shown) to the rim 202 and a second, outer portion of the spoke 200 is constituted by the threaded portion 210 and the unthreaded portion 213. At about a point where the spoke 200 exits the spoke bore, between the first portion 214 and second portion of the spoke 200, there is a bend 216 in the spoke 200. The bend 216 is preferably formed in the spoke 200 during the process of building a wheel including the spoke 200 and other spokes, the rim 202 and a wheel hub (not shown). The formation of the bend 216 will be further explained below in the context of building such a wheel.

A wheel for a bicycle or other human powered vehicle typically comprises a hub with a pair of opposed hub flanges and spoke openings in the hub flanges for receiving a spoke and seating a head on the spoke adjacent to a J-bend provided at a first end of the spoke. A second end of the spoke is typically threaded and, initially, the spoke is straight from the J-bend to the threaded end. The reader may refer to U.S. Pat. No. 5,445,439, the disclosure of which is incorporated herein by reference, for further details concerning human powered vehicle wheels. In building a wheel, one guides the threaded end of each spoke through its spoke opening in the hub flange until the spoke head engages the hub flange. The threaded end of each spoke is then guided through its spoke opening in a rim and an internally threaded nipple or the like is turned to engage a portion of the threaded portion of the spoke until all spokes are roughly in place. Then, the spokes are tightened towards and to a final design tension and, finally, the wheel is trued by individual adjustment of certain ones of the spokes. There are wheel building machines which automate some or all of these steps. As the spokes are tightened, the spoke is elastically deformed at first, and then plastically deformed so that it takes on a permanent bend where it enters or exits the rim, remote from the threaded portion of the spoke.

Referring again to FIG. 7, in the process of building a wheel including, the threaded end of the spoke 200 is threaded through a hole in a hub flange (not shown), through the spoke bore 208, through the spacer 205 and the nipple 204 is turned onto the threaded portion 210 of the spoke. Co-action between the spoke bed 206 and the connector comprising the nipple 204 and the spacer 205, causes the threaded portion 210 of the spoke 200 to be aligned radially, i.e., along a radius R of the wheel. The first portion of the spoke, between the hub and the rim, will be skewed relative to the axis of the threaded portion 210, to account for the centering angle and, if present, the torsional angle. As a consequence, the spoke 200 will not be straight. As the nipple is tightened towards a final design tension, the spoke 200, will attempt to straighten, tending to cause the spoke to bend, initially, at a point 220 where the spoke exits the nipple 204. This bending will continue until a portion of the spoke 200 engages a portion of the rim which defines the spoke bore 208 (not shown) at which point the axis of the unthreaded portion 213 will be aligned, as indicated at EB, forming an angle, designated alpha, with respect to the radius R of the wheel. This bending does not exceed the elastic limits of the spoke 200 and no permanent bend is imparted to the spoke adjacent the point 220. As the spoke is tightened further, the constrained spoke 200 will tend to bend at a point designated 222 to accommodate the skew between the axis EB of the unthreaded portion 213 and the axis SA of the first portion 214 of the spoke. This bending does exceed the elastic limits of the spoke so that the spoke 200 takes on the permanent bend 216 adjacent the point where the spoke 200 exits the rim 202. The angle beta, between the axis EB of the unthreaded portion 213 and the axis SA of the first portion 214 of the spoke 200, is larger than the angle alpha.

Figure 8:
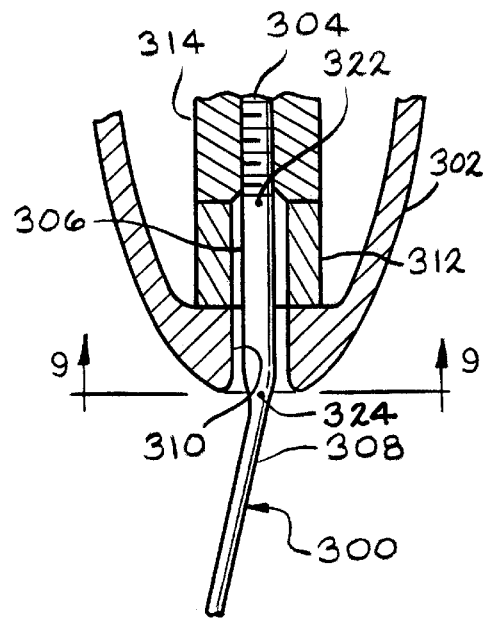
FIG. 8 is a view, partially in cross-section, of a portion of a rim section illustrating a spoke and rim connection, wherein the spoke is a bladed spoke, according to the present invention.
Figure 9:
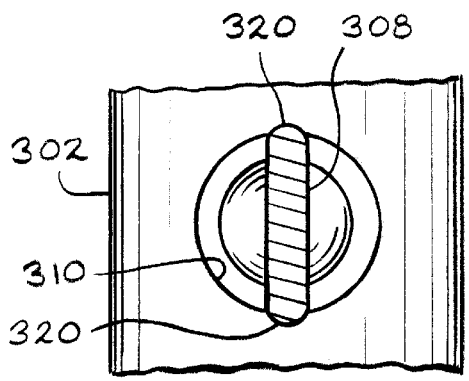
FIG. 9 is a view taken along the line 9—9 of FIG. 8.

Referring now to FIGS. 8 and 9, another embodiment of the invention will now be described. A bladed spoke 300 is connected to a carbon fiber rim 302. The spoke corresponds with one that is commercially available as a stock DT New Aero spoke. It is stainless steel and has a J-bend (not shown) at one end, a threaded portion 304 at the opposite end, a round, unthreaded portion 306 and a bladed or flat portion 308. A first portion of the spoke 300 extends from a hub (not shown) to the rim 302 and corresponds with the bladed portion 308. A second portion of the spoke 300 comprises the threaded portion 304 and the adjacent, unthreaded portion 306.

Front and rear wheels were produced with the bladed spokes 300, tubular, carbon fiber rims which are commercially available from Lew Composites of Las Vegas, Nev., and front and rear hubs corresponding with the front and rear hubs used in Rolf (trademark) Vector Pro wheels which are commercially available from Trek Bicycle Company. Sixteen spokes were used on the front and rear wheels and the lacing pattern of the spokes corresponded with the lacing pattern of the corresponding Vector Pro wheels. The threaded ends of the spokes 300 were laced through the spoke holes in the hub flanges and then through spoke bores, indicated at 310, through spacers 312 and nipples 314 were turned onto the threaded portions 304 of the spokes 300. Dimensions were controlled so that, as shown in FIG. 9, edges 320 of the bladed portions 308 of the spokes 300 engaged a portion of the wall defining the spoke bore 310. The distance between the two edges exceeded the diameter of the spoke bore 310 by less than one millimeter. Yet, the engagement between the edges 320 and the wall defining the spoke bore 310 prevented lateral movement of the spoke within the bore 310. Accordingly, as the spokes were brought up to wheel design tension, between 200 and 400 pounds per spoke, the spokes did not bend at a point 322 between the threaded portion 304 and the unthreaded portion 306. Instead, the spokes bent at a point 324, right where the edges 320 engaged the wall defining the spoke bore 310.

The front and rear wheels produced as described above were ridden by a two hundred pound rider for 1200 miles with outstanding performance. The rear wheel was further tested on a drum tester comprising a drum which is smooth except for a portion that is raised so that it is three eighths of an inch off of the drum surface, and a fixture for supporting the wheel with a one hundred and fifty pound load applied at the axle, which is equivalent to having a three hundred pound rider. The drum and wheel are rotated to simulate a road speed of 47 miles per hour. The rear wheel racked up 49 hours on the drum test with no spoke failure.

Figure 10:
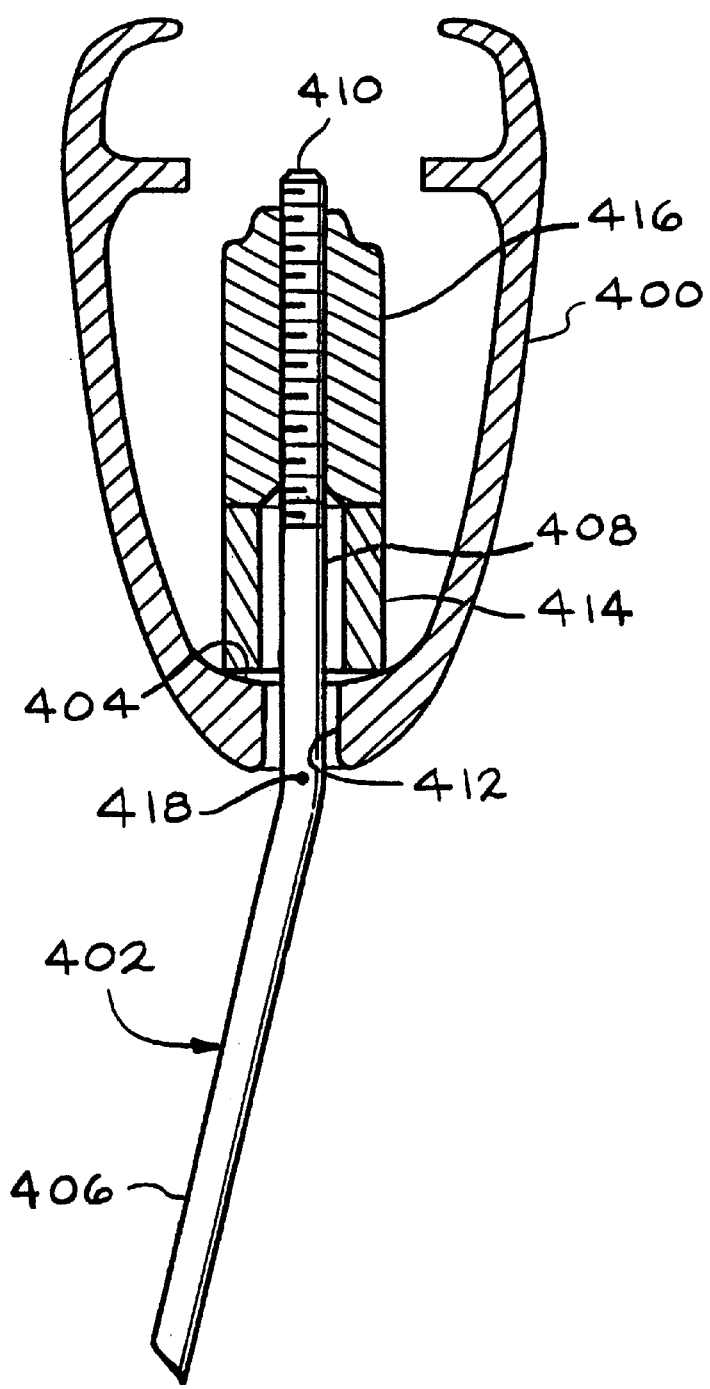
FIG. 10 is a view, partially in cross-section, of a portion of a rim section, including a curved rim floor, showing a spoke and rim connection according to the present invention.

Additional wheels were built according to the present invention from aluminum rims in clincher and tubular styles, but otherwise corresponding with the wheels described above with reference to FIGS. 8 and 9. Referring now to FIG. 10, a clincher rim 400 is illustrated with a bladed or aero type spoke 402 secured to the rim 400. The rim 400 has a rounded spoke bed 404. The spoke 402 comprises a first, bladed portion 406 and a second portion comprising an unthreaded portion 408 and a threaded portion 410. As a wheel is produced including the rim 400, the threaded end 410 of each spoke is first inserted through a hub flange spoke opening, through a spoke bore indicated at 412 in the rim 400, through a spacer 414, and an internally threaded nipple is threaded onto the threaded end 410 of the spoke 402. Edges (not shown) of the bladed portion 406 of the spoke 402 engage a portion of the wall defining the spoke bore indicated at 412, preventing bending of the spoke 402 in the unthreaded portion 408. As the spoke 402 is further tensioned, the spoke elastically deforms at first, and then plastically deforms causing it to take on a permanent bend at a point 418 between the first, bladed portion 406 and the unthreaded portion 408. A front clincher wheel so produced was tested on the drum tester described above until the rim cracked. The rim was replaced and the wheel was rebuilt with the same spokes. This was repeated six more times until each spoke had racked up 189 hours on the drum tester without a single spoke failure.

Figure 11:
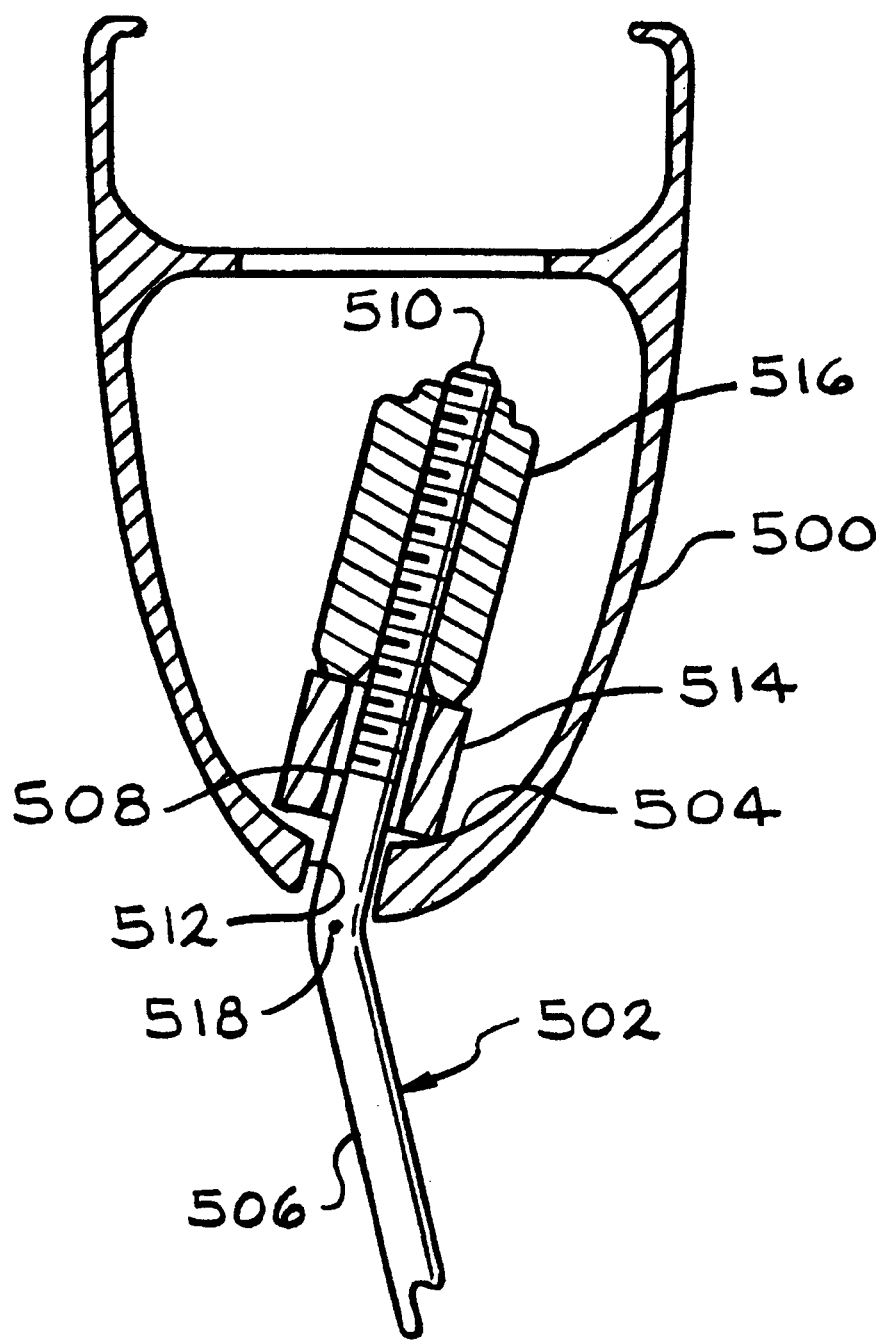
FIG. 11 is a view, partially in cross-section, of a portion of a rim section illustrating a spoke and rim connection according to the present invention wherein the threaded portion of the spoke is not radially oriented.

Referring now to FIG. 11, an aluminum rim 500 and a spoke 502 are illustrated. This wheel corresponds generally with previously described wheels. The rim 500 has a curved spoke bed 504 and a first, bladed portion 506 of the spoke 502 terminates just below the point where the spoke 502 enters the rim. Adjacent to the bladed portion 506, there is an unthreaded portion 508 and the spoke 502 terminates in a threaded portion 510. The spoke 502 passes through a spoke bore indicated at 512 in the rim 500, through a spacer 514 and into an internally threaded nipple 516. The nipple and the spacer cooperate with the spoke bed 504 so that the axis of the unthreaded portion 508 and axis of the threaded portion 510 of the spoke 502 do not coincide with and are not parallel to a radius of the wheel. As the spoke is tightened, the spoke is deformed elastically, at first, and the deformed plastically causing it to take a permanent bend at the point 518, between the bladed portion 506 and the unthreaded portion 508.

In sum, the present invention involves a method for producing a wheel from a rim, a hub and a plurality of spokes which are essentially straight wherein, as each spoke is tightened in the wheel, a permanent bend is made in the spoke, at a point remote from an intersection between an outer threaded portion and an adjacent, unthreaded portion.

The foregoing description is intended to enable one skilled in the art to practice this invention and constitutes the best mode presently known to the inventor for carrying out the invention. Modifications and adaptations of the invention, as described herein, will undoubtedly occur to those skilled in the art and, although not described herein, may nevertheless fall within the spirit and scope of the invention as defined in the claims.

I claim:

1. A method for building a wheel comprising a hub, a rim, a plurality of spokes each having an externally threaded end, a plurality of spacer elements, and a plurality of connectors each having an internally threaded portion, said method comprising the steps of inserting the threaded ends of the spokes through spoke holes in the rim, through the spacer elements, and into the connectors, engaging the threaded ends of the spokes with the internally threaded portions of the connectors, and turning the connectors to tighten the spokes, wherein said wheel and said connectors cooperate to maintain the axis of the threaded end of each spoke in a given spoke hole so that it is skewed relative to the axis of a first portion of each spoke, which extends from the hub to the rim and wherein, while the connector is turned to tension each spoke, each spoke takes on a permanent bend at a point remote from the threaded portion of the spoke.

2. The method claimed in claim 1 wherein the spacer elements are costitute integral portions of the connector.

3. The method claimed in claim 1 wherein the spacer elements are separate from the connectors.

4. The method claimed in claim 1 wherein the bends in the spokes are formed adjacent to the spoke holes in the rim.

5. The method claimed in claim 1 wherein the bends in the spoke are formed adjacent to points where the spoke exit the rim.

6. The method claimed in claim 1 wherein portions of the spokes, remote from The threaded end portions, engage the rim adjacent to the spoke hole.

7. The method claimed in claim 1 wherein the connectors are oriented radially, relative to the axis of the wheel after the spokes are tightened.

8. The method claimed in claim 1 wherein the connectors are oriented so that they are not aligned radially, relative to the axis of the wheel, after the spokes are tightened.

* * * * *